(12) United States Patent
Chatterji et al.

(10) Patent No.: US 7,971,229 B1
(45) Date of Patent: Jun. 28, 2011

(54) NON-OBTRUSIVE SECURITY SYSTEM FOR DEVICES

(75) Inventors: Varun Chatterji, Singapore (SG); Rishi Kumar, Singapore (SG); Vedvyas Jayaraghavendran, Singapore (SG); Indradeep Biswas, Singapore (SG); Kapil Mahajan, New Delhi (IN)

(73) Assignee: McAfee, Inc., Santa Clara, CA (US)

( * ) Notice: Subject to any disclaimer, the term of this patent is extended or adjusted under 35 U.S.C. 154(b) by 956 days.

(21) Appl. No.: 11/772,065

(22) Filed: Jun. 29, 2007

(51) Int. Cl.
*G06F 17/00* (2006.01)

(52) U.S. Cl. .......................................................... 726/1

(58) Field of Classification Search ........................ None
See application file for complete search history.

(56) References Cited

U.S. PATENT DOCUMENTS

| 6,993,322 B1 | 1/2006 | Kirby et al. | |
| 7,053,771 B2 | 5/2006 | Hussmann | |
| 2007/0300299 A1* | 12/2007 | Zimmer et al. | 726/22 |
| 2010/0064341 A1* | 3/2010 | Aldera | 726/1 |

* cited by examiner

*Primary Examiner* — Brandon S Hoffman
(74) *Attorney, Agent, or Firm* — Patent Capital Group

(57) ABSTRACT

A security system is provided including providing a device including: storing a security rule for operation of the device when an event occurs; and implementing the security rule upon the occurrence of the event to allow non-obtrusive user access to the device.

20 Claims, 3 Drawing Sheets

| EVENT | REQUIRED CONDITIONS | OPERATIONS | POSTCONDITIONS |
|---|---|---|---|
| DEVICE STARTUP | NONE | PERFORM PRE-AUTHENTICATION USING TOS APIS | USER AUTHENTICATED |
| NETWORK DISCONNECTED | NONE | LOCK DEVICE & SET NETWORK CONNECTIVITY FLAG | DEVICE LOCKED & NETWORK CONNECTIVITY FLAG IS SET |
| NETWORK CONNECTED | DEVICE LOCKS & NETWORK COVERAGE FLAG IS SET | UNLOCK DEVICE & UNSET NETWORK CONNECTIVITY FLAG | DEVICE UNLOCKED & NETWORK CONNECTIVITY FLAG IS NOT SET |

FIG. 3

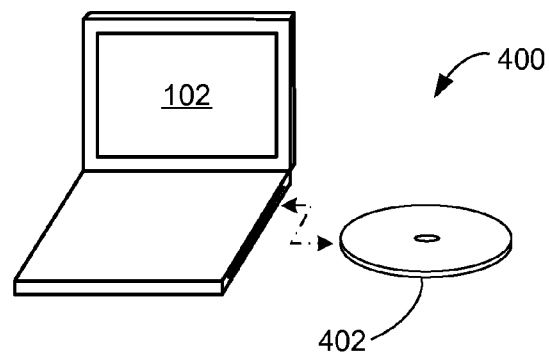

FIG. 4

NON-OBTRUSIVE SECURITY SYSTEM FOR DEVICES

TECHNICAL FIELD

The present invention relates generally to electronic devices, and more particularly to a security system for devices.

BACKGROUND ART

Security is a critical issue with almost all aspects of computer use and mobile electronic device use including such devices as computers, mobile phones, handheld computers, etc.

All modern operating systems provide a mechanism for security that involves some form of authentication or authorization, hereinafter generically referred to as authentication, to determine if a rightful user is accessing the system. For example, such a mechanism is the prompt for a user name and password by an operating system in a personal computer when it is powered up. Another example of such a mechanism is the prompt for authentication information when a user accesses a protected resource such as a secure file in a database. Implementing such security measures often requires modification of the user's behavior which, at the very least, involves the user having to enter authentication information one or more times while accessing the protected resource.

Requiring users to modify their behavior in order to obtain data security is a particularly arduous task, especially in the context of mobile devices. Most users are not used to securing their mobile devices with power-on user name and password, authentication information, etc. However, this is important to prevent unauthorized users from being able to incur large phone charges against the rightful user's cell phone account or accessing information that maybe deemed to be of a sensitive nature.

In the past, there have been several methods to reduce the complexity of the task of authorization, such as the use of picture passwords, key-based locking systems, transponder-based authentication, etc.

However, all such methods, while reducing the complexity of entering authorization information, still required such information to be provided and hence required a change in the usage behavior of a user who was used to using the cell phone without having to use security precautions before.

Also in the past, software security systems were used with subscriber identity modules (SIMs) or cards that enabled remote device management using protocols such as Open Mobile Alliance's SyncML (Device Management) protocol, etc. Such management software may be used to provide mobile devices with appropriate security features. Using such software, a security policy could be defined which did not prompt for any authentication or authorization unless a device had been marked as a security threat (in an event such as the device being lost or stolen, the SIM being changed, etc.)

However, if the device connectivity environment changed (in events such as changing the SIM, roaming to a different mobile network, etc), the device would not be able to communicate with the management software backend (server) and hence it would not be possible to remotely lock or wipe data off of the device.

Also, if the device is reset to default factory settings by formatting it, all connectivity is lost with the management software backend, and thus the device can thereafter be easily used without security protection. Thus, the best way currently known to ensure that the device is secure is to use some form of authentication or authorization while the device is running to ensure that the device is in the hands of the right user. Such a method, however, requires changes in the usage pattern for users not accustomed to taking security precautions.

Solutions to these problems have been long sought but prior developments have not taught or suggested any solutions and, thus, solutions to these problems have long eluded those skilled in the art.

DISCLOSURE OF THE INVENTION

The present invention provides a security system comprising providing a device including: storing a security rule for operation of the device when an event occurs; and implementing the security rule upon the occurrence of the event to allow non-obtrusive user access to the device.

Certain embodiments of the invention have other aspects in addition to or in place of those mentioned above. The aspects will become apparent to those skilled in the art from a reading of the following detailed description when taken with reference to the accompanying drawings.

BRIEF DESCRIPTION OF THE DRAWINGS

FIG. 3 is a table of an exemplary security policy in an exemplary policy store of FIGS. 1 and 2;

FIG. 4 is a view of a portion of a security system in which a software product is being loaded into a device in accordance with a second embodiment of the present invention;

BEST MODE FOR CARRYING OUT THE INVENTION

Figure 1:
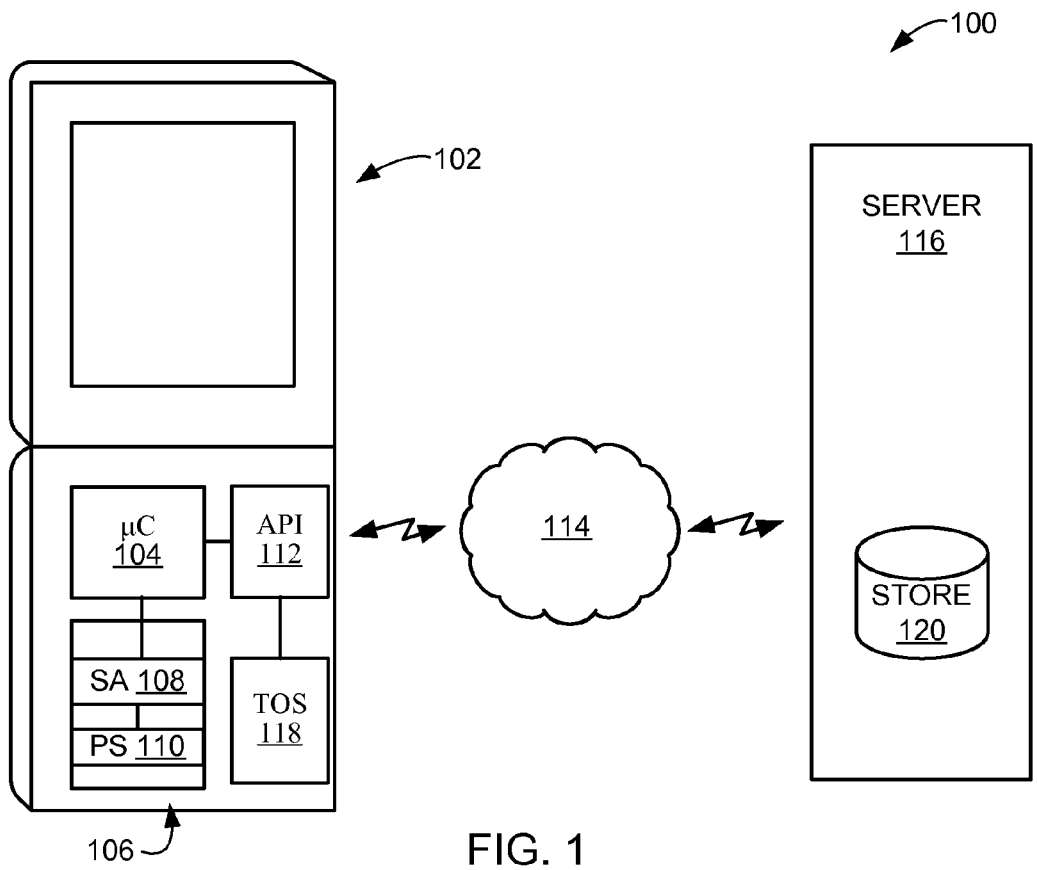
FIG. 1 is a view of a security system in accordance with a first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

Likewise, the drawings showing embodiments of the system are semi-diagrammatic and not to scale and, particularly, some of the dimensions are for the clarity of presentation and are shown greatly exaggerated in the drawing FIGs.

The term "obtrusive" means that an input from a user is required during regular usage or that a change is required in the user's behavior; e.g., by the input of a password, connection of a dongle or key, contacting a trusted authority, etc.

The term "non-obtrusive" means that no input from a user is required during regular usage or that no change is required in the user's behavior.

In various embodiments of the present invention a multi-tier security model is described that uses security mechanisms such as prompting for authentication or authorization information on device startup while augmenting the security mechanism with an intelligent security agent that satisfies the security method non-obtrusively based on remotely set policies.

Additional embodiments of the present invention provide a security policy that may be used in conjunction with the multi-tier security mechanism and an agent-based approach to ensure that security is not compromised even when the device is formatted or in periods of communication blackout with the management software backend.

Various other embodiments of the present invention provide for a software product that can be directly loaded and deployed in an operating system based device. The software product enables remotely setting security policies and describes a version of a conventional agent, which is an intelligent state based agent that performs the intelligent security agent functions.

Further embodiments of the present invention ensure that in the event of the un-installation of a security agent through formatting a device or otherwise, the device security is maintained. In the event of un-installation, the user of the device will be prompted for authentication information, which would not ordinarily be required when the intelligent security agent is present.

Further embodiments of the present invention ensure that there exists a mechanism of security (through a policy as enforced by the intelligent security agent) that is non-obtrusive.

Referring now to FIG. 1, therein is shown a security system 100 in accordance with a first embodiment of the present invention. The security system 100 includes a device 102, which contains a processor system 104, such as a microcontroller or microcontroller, implementing an intelligent security agent 108 in hardware or in software stored on any such media that the device maybe equipped with including but not limited to flash memory, ROM and other such forms of programmable or permanent memory, and a policy store 110 stored in a memory 106. The intelligent security agent 108 is considered intelligent because it responds differently to different events based on instructions in the policy store 110.

The device 102 can be an operating system based device such as a cell phone, personal digital assistant, palm computer, etc. and the device 102 runs the terminal operating system (TOS) 118

The intelligent security agent 108 communicates using an operating system application programming interface (API) 112 through a wireless network 114, such as a cell network, Internet, etc., with a server system 116 to retrieve a set of determined rules from storage 120 and caches them locally in the policy store 110.

When the device 102 starts up, the intelligent security agent 108 communicates with the terminal operating system 118 and in accordance with the rules defined in the policy store 110 pre-authenticates the device 102, for example by entering a stored user name and password, in the processor system 104 or terminal operating system 118 non-obtrusively for the user.

Since the device user name and password are persistent even when the device 102 is formatted, formatting the device 102, which also removes the intelligent security agent 108, will still ensure device security because the device 102 will require the user name and password after the formatting is completed without the pre-authentication being performed by the intelligent security agent 108.

This will ensure that, while the device 102 has the intelligent security agent 108 installed, no change in user behavior is required unless the policy in the policy store 110 dictates such change. If the intelligent security agent 108 is not installed, the device 102 is still secure since the terminal operating system 118 on the device 102 will ask the user to authenticate when the device 102 starts up.

Figure 2:
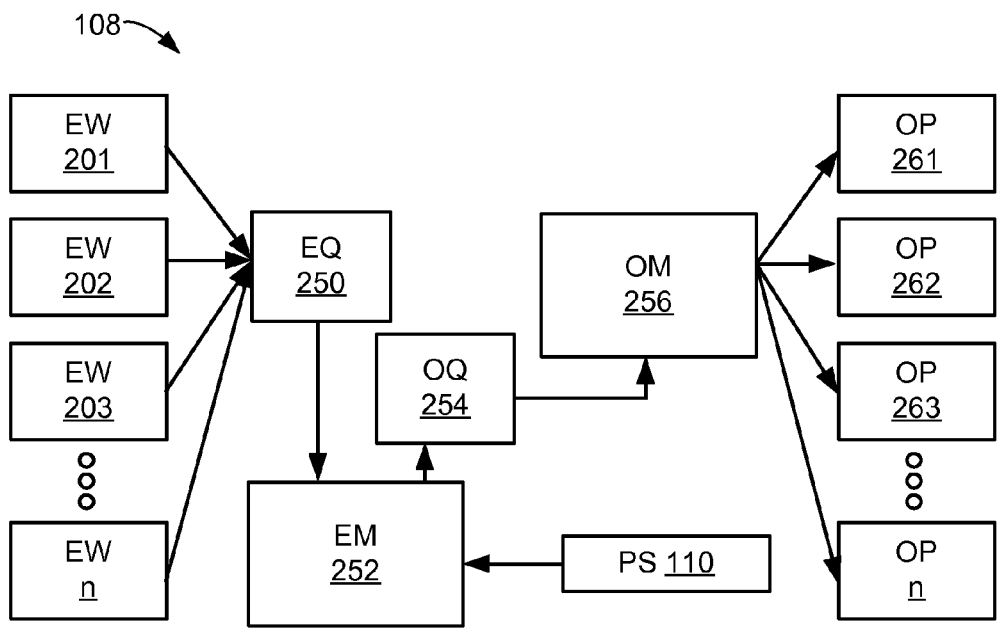
FIG. 2 is a view of a schematic of an exemplary intelligent security agent of FIG. 1.

Referring now to FIG. 2, therein is shown a schematic of the intelligent security agent 108 in accordance with an embodiment of the present invention.

The intelligent security agent 108 includes one or more event watchers 201 through n. The event watchers 201 through n watch for various events to occur, such as, but not limited to, device startup, SIM change, etc. The event watchers 201 through n are connected to an event queue 250, which in turn is connected to an event manager 252.

The event manager 252 receives information from the policy store 110 and provides instructions for an operation into an operations queue 254.

An operations manager 256 then executes the operation from the operations queue 254 in various operations, designated as operations 260 through n.

The intelligent security agent 108 is a software construct in which each of the elements may be coupled together or decoupled, implemented as one software component or multiple components where the various functions are performed.

In operation, the event watchers 201 through n watch for an event to occur. When the event occurs, an event watcher, for example the event watcher 201, adds an appropriate record in the event queue 250. The event manager 252 takes each event from the event queue 250 and then queries the policy store 110 to determine if the event has any corresponding operation or operations to be performed on the device 102 of FIG. 1.

If an operation or operations are to be performed, the event manager 252 adds an appropriate record to the operations queue 254. The operations manager 256 then executes the desired operation as an operation 260.

Referring now to FIG. 3, therein is shown a table of an exemplary security policy in an exemplary policy store of FIGS. 1 and 2.

The table of FIG. 3 has column headings of "Event", "Required conditions", "Operations", and "Post conditions" and is described in conjunction with FIG. 2.

The "Event" column lists the events watched for by the event watchers 201 through n. When an event occurs, the event watcher 201 through n adds a note from the appropriate list under "Required Conditions" and provides the information to the event queue 250. The "Required Conditions" are the conditions that are required for an operation to be performed. If the "Required Conditions" are met, the event manager 252 then adds the operation to be performed from the "Operations" column to the operations queue 254. When the operations in the operations queue 254 are performed, the results are as indicated in the column "Post conditions".

Thus, as examples, on device startup, there are no preconditions, and the operation to be performed is the pre-authentication using the terminal operating system 118 through the application programming interface 112 to result in the user being authenticated. Where an event is the network being disconnected, there are no required conditions, and the operation desired is to lock the device 102 of FIG. 1 and to set a network connectivity flag to result in the device 102 being locked and the network connectivity flag being set. Where the event is the network being connected, the required condition is that the device 102 is locked and the network coverage flag is set and the operation to be performed is the unlocking of the device 102 and the unsetting of the network connectivity flag to result in the post condition of the device being unlocked and the network connectivity flag not being set.

The above provides that the device 102 is usable only while it is connected to a network through the application programming interface 114.

Also with the above, the user does not need to enter any authentication while the intelligent security agent 108 is installed on the device 102, and hence non-obtrusive security is provided.

However, the user will be prompted for authentication if the intelligent security agent 108 is removed from the system in which case the security becomes obtrusive.

For example, when the event watcher 201, for example, signals a device startup event, the operation 261, which could be the pre-authentication operation, is performed by the operations manager 256, and thus the user does not need to enter any authentication information on device startup. This is true as long as the intelligent security agent 108 is present and the policy described in FIG. 3 is in force.

When an event watcher 203, for example, signals a Network Disconnected event, the operation 262, which could be a lock operation, is performed and the network connectivity flag is set by the operations manager 256. Thus, the device 102 is rendered unusable in periods of connectivity blackouts.

In a Network Connected event with the device 102 currently locked and the network connectivity flag set, the operation 263, which could be an unlock operation, is performed and the network connectivity flag is unset by the operations manager 256. Thus, the device 102 is rendered usable again when connectivity is restored.

Referring now to FIG. 4, therein is shown a portion of a security system 400 in which a software product 402 is being loaded into the device 102 in accordance with a second embodiment of the present invention. The software product 402 may be in the form of a diskette, RAM disk, magnetic tape, CD-ROM, Flash drive, or any other suitable software carrier. The device 102 is an exemplary palm computer.

Figure 5:
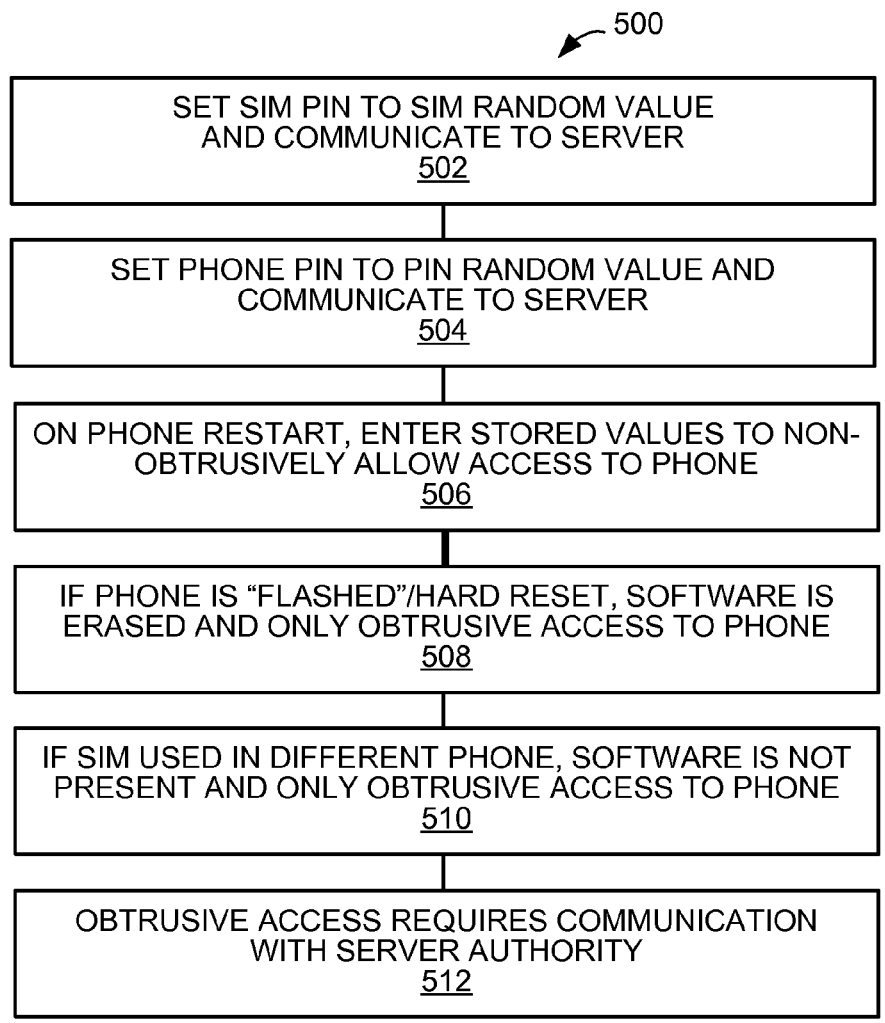
FIG. 5 is a flow chart of a security system in accordance with a third embodiment of the present invention.

Referring now to FIG. 5, therein is shown a flow chart of a security system 500 in accordance with a third embodiment of the present invention.

For example, where the device 102 of FIG. 1 is a SIM equipped cell phone, the following steps will be involved:
1: Programmably set/change the SIM pin in the cell phone to a random value (with or without the user's knowledge) and communicate the SIM random value to a server in a block 502.
2. Programmably set/change the cell phone PIN to a random value (with or without the user's knowledge) and communicate the PIN random value to the server in a block 504.
3. On cell phone restart, programmably enter the SIM and PIN random values so that the user is not prompted for these values (non-obtrusive behavior) in a block 506.
4. If the cell phone is "flashed" or hard reset, the software is erased and is no longer present to programmably enter the SIM and PIN random values, hence the user is prompted for these values in a block 508.
5. If the SIM is used in another cell phone, the software is not present on the other cell phone to enter the SIM PIN at device startup, hence the user is prompted for these values in a block 510.
6. If the user is prompted for values, the user has to communicate with the authority in charge of the server to obtain the values to gain access to the cell phone in a block 512.

Security is insured because the software must always be installed on the cell phone and with it not being installed, the phone and the SIM are rendered useless without the permission of the trusted authority.

It is also possible to tie a SIM to a specific cell phone rendering it useless in any other cell phone. For example, the security software that implements this system is installed on the cell phone. If a thief removes the SIM and tries to use it in another cell phone, the SIM has the PIN enabled, and thus the thief will be prompted for a PIN in the other cell phone.

On the particular cell phone itself, use of the SIM could be prevented by set policies that the intelligent security agent may choose to implement; e.g., the SIM is allowed to call only certain numbers, etc.

Figure 6:
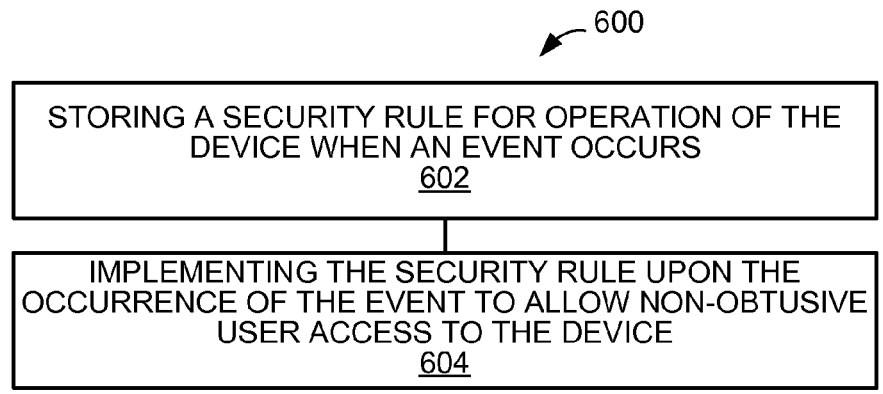
FIG. 6 is a flow chart of a security system in accordance with a fourth embodiment of the present invention.

Referring now to FIG. 6, therein is shown a flow chart of a security system 600 in accordance with a fourth embodiment of the present invention. The security system 600 includes providing a device including: storing a security rule for operation of the device when an event occurs in a block 602; and implementing the security rule upon the occurrence of the event to allow non-obtrusive user access to the device in a block 604.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

The invention claimed is:

1. A non-obtrusive security system comprising:
   storing a security rule for operation of a device when an event occurs, wherein the security rule is provided in conjunction with a security agent operating on the device; and
   implementing the security rule upon the occurrence of the event to allow non-obtrusive user access to the device, wherein the device is a mobile device in which a subscriber identity module (SIM) pin is changed by the security agent without knowledge of a user of the mobile device, and wherein the SIM pin is communicated to a server, and wherein as the mobile device is restarted the SIM in is entered into the mobile device without user involvement.

2. The system as claimed in claim 1 further comprising connecting the device to a server wherein implementing the security rule includes providing for obtrusive user access when the device is not in contact with the server.

3. The system as claimed in claim 1 wherein providing the device includes providing a security agent and providing for obtrusive user access to the device when the security agent is inactive.

4. The system as claimed in claim 1 wherein implementing the security rule includes watching for the event to occur and determining from the security rule an operation to be performed for the event.

5. The system as claimed in claim 1 wherein implementing the security rule includes:
   watching for the event to occur;
   managing the event to determine the security rule and operation applicable to the event; and
   performing the operation in response to the event occurring.

6. A non-obtrusive security system comprising:
   storing a security rule for operation of a device when an event occurs, wherein the security rule is provided in conjunction with a security agent operating on the device; and implementing the security rule upon the occurrence of the event to allow non-obtrusive user access to data in the device, wherein the device is a mobile device in which a subscriber identity module (SIM) pin is changed by the security agent without knowledge of a user of the mobile device, and wherein the SIM in is communicated to a server, and wherein as the mobile device is restarted the SIM pin is entered into the mobile device without user involvement.

7. The system as claimed in claim 6 further comprising connecting the operating system based device to a server wherein implementing the security rule includes providing for obtrusive user access when the operating system based device is not in contact with the server.

8. The system as claimed in claim 6 wherein providing the operating system based device includes providing a intelligent security agent and providing for obtrusive user access when the operating system based device does not have a intelligent security agent.

9. The system as claimed in claim 6 wherein implementing the security rule includes watching for the event to occur and determining from the security rule an operation to be performed for the event.

10. The system as claimed in claim 6 wherein implementing the security rule includes:
- watching for a plurality of events to occur including the event wherein the event includes startup, network disconnected, or network connected;
- queuing the plurality of events as the plurality of events occurs;
- managing the plurality of events to determine the security rule and operations applicable to each of the plurality of events;
- queuing the operations to be performed for each of the plurality of events; and
- performing the operations in response to each of the plurality of events occurring to respectively cause pre-authentication, prevent authentication, or cause pre-authentication.

11. A non-obtrusive security system comprising:
a device including:
- a policy store for storing a security rule for operation of the device when an event occurs, and
- a security agent for implementing the security rule upon the occurrence of the event to allow non-obtrusive user access to the device, wherein the device is a mobile device in which a subscriber identity module (SIM) in is changed by the security agent without knowledge of a user of the mobile device, and wherein the SIM pin is communicated to a server, and wherein as the mobile device is restarted the SIM in is entered into the mobile device without user involvement.

12. The system as claimed in claim 11 further comprising:
a server; and
a network connecting the device to the server wherein implementing the security rule includes providing for obtrusive user access when the device is not in contact with the server.

13. The system as claimed in claim 11 wherein the device is for providing for obtrusive user access to the device when the security agent is inactive.

14. The system as claimed in claim 11 wherein the security agent includes an event watcher for watching for the event to occur and determining from the security rule an operation to be performed for the event.

15. The system as claimed in claim 11 wherein the security agent includes:
- an event watcher for watching for the event to occur;
- an event manager for managing the event to determine the security rule and operation applicable to the event; and
- an operations manager for performing the operation in response to the event occurring.

16. A non-obtrusive security system comprising:
an operating system based device including:
- a policy store for storing a security rule for operation of the operating system based device when an event occurs, and
- an intelligent security agent for implementing the security rule upon the occurrence of the event to allow non-obtrusive user access to data in the operating system based device, wherein the device is a mobile device in which a subscriber identity module (SIM) pin is changed by the security agent without knowledge of a user of the mobile device, and wherein the SIM in is communicated to a server, and wherein as the mobile device is restarted the SIM pin is entered into the mobile device without user involvement.

17. The system as claimed in claim 16 further comprising:
a server; and
a network for connecting the operating system based device to the server wherein implementing the security rule includes providing for obtrusive user access when the operating system based device is not in contact with the server.

18. The system as claimed in claim 16 wherein the operating system based device is for providing for obtrusive user access when the operating system based device does not have the intelligent security agent.

19. The system as claimed in claim 16 wherein the intelligent security agent is for watching for the event to occur and the policy store is for providing information for the intelligent security agent perform an operation to be performed for the event.

20. The system as claimed in claim 16 wherein the intelligent security agent includes:
- event watchers for watching for a plurality of events to occur including the event wherein the event includes startup, network disconnected, or network connected;
- an event queue for queuing the plurality of events as the plurality of events occurs;
- an event manager for managing the plurality of events to determine from the policy store the security rule and operations applicable to each of the plurality of events;
- an operations queue for queuing the operations to be performed for each of the plurality of events; and
- an operations manager for performing the operations in response to each of the plurality of events occurring to respectively cause pre-authentication, prevent authentication, or re-enable pre-authentication.

* * * * *